US008606628B2

(12) United States Patent
Smith et al.

(10) Patent No.: US 8,606,628 B2
(45) Date of Patent: Dec. 10, 2013

(54) USER DRIVEN TRANSACTIONS THROUGH REFERRED VIRTUAL BUSINESS OBJECT (75) Inventors: Andrew B. Smith, Morrisville, NC (US); Brian R. Bokor, Raleigh, NC (US); Peter F. Haggar, Raleigh, NC (US); Daniel E. House, Raleigh, NC (US); William B. Nicol, II, Durham, NC (US); Christopher J. Dawson, Arlington, VA (US)

(73) Assignee: International Business Machines Corporation, Armonk, NY (US)

( * ) Notice: Subject to any disclaimer, the term of this patent is extended or adjusted under 35 U.S.C. 154(b) by 528 days.

(21) Appl. No.: 12/354,051

(22) Filed: Jan. 15, 2009

(65) Prior Publication Data
US 2010/0179871 A1 Jul. 15, 2010

(51) Int. Cl.
*G06Q 30/00* (2012.01)
*G06F 19/00* (2011.01)
*G06F 17/00* (2006.01)

(52) U.S. Cl.
USPC ........................................................ 705/14.1

(58) Field of Classification Search
USPC ............................................................ 705/14
See application file for complete search history.

(56) References Cited

U.S. PATENT DOCUMENTS

| 5,892,900 | A | 4/1999 | Ginter et al. |
| 5,926,179 | A | 7/1999 | Matsuda et al. |
| 6,414,679 | B1 | 7/2002 | Miiodonski et al. |
| 6,912,565 | B1 | 6/2005 | Powers et al. |
| 7,249,139 | B2 | 7/2007 | Chuah et al. |
| 7,280,991 | B1 | 10/2007 | Beams et al. |
| 7,412,422 | B2 | 8/2008 | Shiloh |
| 7,469,217 | B2 | 12/2008 | Kidd et al. |
| 7,519,547 | B2 | 4/2009 | Rodriguez et al. |
| 7,568,017 | B2 | 7/2009 | Shah et al. |
| 7,660,778 | B1 | 2/2010 | Nichols |
| 2001/0020231 | A1* | 9/2001 | Perri et al. ...................... 705/14 |
| 2002/0169726 | A1 | 11/2002 | Taylor et al. |
| 2003/0028451 | A1* | 2/2003 | Ananian ......................... 705/27 |
| 2003/0061104 | A1 | 3/2003 | Thomson et al. |
| 2003/0061171 | A1 | 3/2003 | Gilbert et al. |
| 2003/0227392 | A1 | 12/2003 | Ebert et al. |
| 2004/0103022 | A1* | 5/2004 | Chilcoat et al. .................. 705/14 |
| 2005/0216346 | A1* | 9/2005 | Kusumoto et al. .............. 705/14 |

(Continued)

OTHER PUBLICATIONS

"Transaction—Definition and More from the Free Merriam-Webster Dictionary." Dictionary and Thesaurus—Merriam-Webster Online. Merriam-Webster. Web. Jan. 18, 2012. <http://www.merriam-webster.com/dictionary/transaction>.*

(Continued)

*Primary Examiner* — Saba Dagnew
*Assistant Examiner* — Vincent Cao
(74) *Attorney, Agent, or Firm* — Moore & Van Allen PLLC (57) ABSTRACT

Providing traceability in a Virtual Business Object (VBO) may include generating a VBO comprising components and actions that may be performed using the VBO, attaching traceability information regarding an avatar to the VBO and providing the VBO to the avatar. Also, a network entity configured to access a virtual world environment may include a network interface configured to provide access to the virtual world environment and a controller configured to perform a transaction with an avatar in the virtual world environment, generate a Virtual Business Object (VBO) related to the transaction, attach traceability information regarding the avatar to the VBO, and provide the VBO to the avatar.

21 Claims, 6 Drawing Sheets

(56) References Cited

U.S. PATENT DOCUMENTS

| | | | |
|---|---|---|---|
| 2005/0234781 A1* | 10/2005 | Morgenstern et al. | 705/26 |
| 2006/0212355 A1* | 9/2006 | Teague et al. | 705/14 |
| 2007/0073582 A1* | 3/2007 | Jung et al. | 705/14 |
| 2007/0087822 A1 | 4/2007 | Van Luchene | |
| 2007/0214030 A1 | 9/2007 | Shear et al. | |
| 2007/0268299 A1 | 11/2007 | Jung et al. | |
| 2008/0004119 A1* | 1/2008 | Van Luchene et al. | 463/42 |
| 2008/0207327 A1 | 8/2008 | Van Luchene et al. | |
| 2009/0070228 A1* | 3/2009 | Ronen | 705/26 |
| 2009/0083051 A1 | 3/2009 | Bokor et al. | |
| 2009/0083052 A1 | 3/2009 | Bokor et al. | |
| 2009/0265761 A1 | 10/2009 | Evanitsky | |
| 2010/0082456 A1 | 4/2010 | Chung | |
| 2010/0115425 A1 | 5/2010 | Bokor et al. | |

OTHER PUBLICATIONS

SECOND LIFE, SecondLife, http:/web.archive.org/web/20060101031416/http://secondlife.com/, dated Sep. 1, 2010, 26 pages.

* cited by examiner

USER DRIVEN TRANSACTIONS THROUGH REFERRED VIRTUAL BUSINESS OBJECT

BACKGROUND OF THE INVENTION

The present invention is related to virtual business objects, and more specifically to user driven transactions through referred virtual business object.

Currently, to order/purchase an item, a user has to walk into a store, visit an Internet site, or call a number. There is no way to expand the opportunity for sales outside of this space thus requiring retailers to try other means of reaching customers through email referrals, Internet ads, etc. For example, there is no easy way to refer a friend to a product/service purchased online. Further, referrals today cross disparate systems and multiple applications reducing the probability of a purchase/usage of a product or service from a referral. Even if a user has a friend refer an item, the user typically only receives a description through email, instant messaging, or verbally. Therefore, if a user wants to purchase this item, they have to perform a series of steps that take them in a variety of directions such as accessing vendor sites or using search engines to identify the product or service they intend to purchase.

Current methods on the Internet take the form of links on a purchase/feedback page that email a person that a user may specify. A user may paste product information via text or URL into an email, Instant Message, etc. and send this to another person or friend, however, this is not an automated path for performing this function for both parties. Each time a friend of a user has to go to a remote site, link or execute a series of disjoined steps, it reduces the likelihood of a completed transaction and the probability that the friend of the user will purchase through the same provider of the recommended product or service as the user is reduced.

BRIEF SUMMARY OF THE INVENTION

According to one aspect of the present invention, a method for providing traceability in a Virtual Business Object (VBO) includes generating a VBO comprising components and actions that may be performed using the VBO, attaching traceability information regarding an avatar to the VBO, providing the VBO to the avatar, performing a second transaction with a second avatar responsive to an action being received from a second VBO, and providing compensation to the avatar responsive to the completed transaction, the second VBO being created from the VBO.

According to another aspect of the present invention, a network entity configured to access a virtual world environment includes a network interface configured to provide access to the virtual world environment; and a controller configured to perform a transaction with an avatar in the virtual world environment, generate a Virtual Business Object (VBO) related to the transaction, attach traceability information regarding the avatar to the VBO, and provide the VBO to the avatar.

According to a further aspect of the present invention, a computer program product comprising a computer useable medium having computer useable program code embodied therewith, the computer useable program code comprising computer useable program code configured to generate a VBO comprising components and actions that may be performed using the VBO, computer useable program code configured to attach traceability information regarding an avatar to the VBO, and computer useable program code configured to provide the VBO to the avatar, computer useable program code configured to perform a second transaction with a second avatar responsive to an action being initiated from a second VBO, and computer useable program code configured to provide compensation to the avatar responsive to the completed transaction.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF THE INVENTION

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, platform, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the present invention, a user controlling an avatar may have a virtual business object (VBO) from a prior purchase of a product or service. The user or avatar may refer the product/service in the VBO to another user or avatar. In this regard, a copy of the VBO may be sent to the second user or avatar where the copied VBO (hereinafter referred to as a VBO light or referred VBO) may or may not contain personal information of the user such as, for example, warranty information, receipt information, payment information, etc. Alternatively, according to embodiments of the present invention, a second user, or avatar, may be provided access to viewable portions of the user's or avatar's VBO where the personal information is not viewable. The second user, or avatar, may interact with the portions of the VBO light and may initiate actions defined in the referred VBO light. These actions may kick off a process with a defined retailer or source of the product or service associated with the VBO and pass the referred VBO light to a specific transaction system allowing the second user, or avatar, to initiate a transaction to purchase the product or service.

According to embodiments of the present invention, a user interacts directly with the referred VBO without having to perform any search or redirection of location. Further, a referred VBO provides a referred product or service allowing a second user or avatar to initiate transactions on the referred VBO with minimal impact to the second user's experience. Further, according to embodiments of the present invention, purchases made by the second user, or avatar, provide the opportunity for the original user, or avatar, making the referral to receive compensation. The compensation may come from a provider of the product or service related to the VBO or from another source. This provides incentive for a purchaser (i.e., user) to refer a VBO to other users, or avatars. This provides benefits to both the buyers and the sellers of the products or services.

Figure 1:
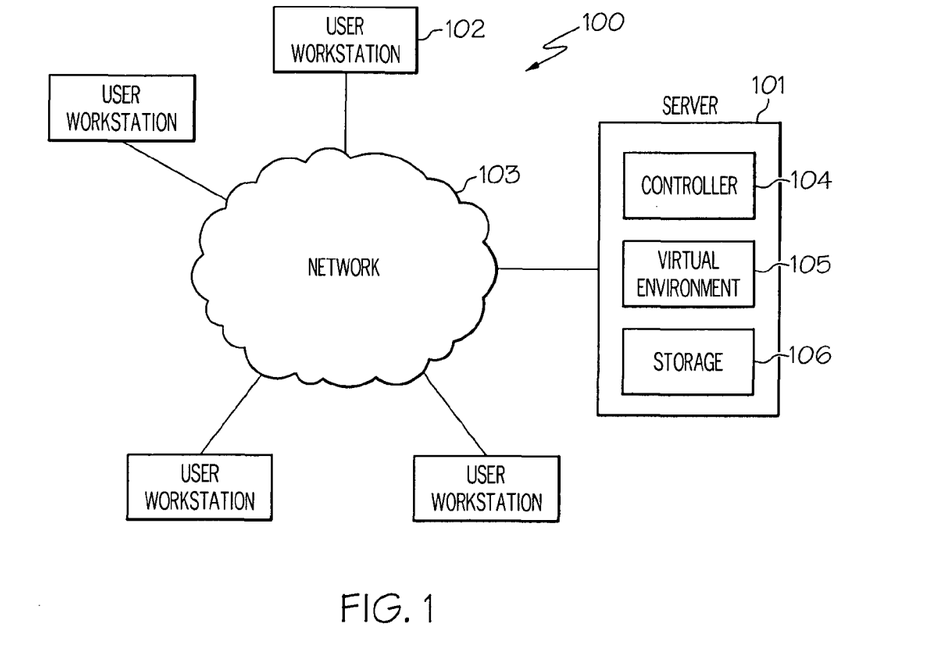
FIG. 1 is a diagram of system for transactions through a referred Virtual Business Object (VBO) according to an exemplary embodiment of the present invention.

FIG. 1 shows a diagram of system for transactions through a referred Virtual Business Object (VBO) according to an exemplary embodiment of the present invention. The system 100 may include a server 101 and one or more workstations 102 where the server 101 and the one or more workstations 102 may be interconnected to a network 103. Although not shown, the workstations 102 may include components typically found in a workstation such as, for example, a processor, a network interface, a storage device, an input device, a display, etc. Moreover, although one server 101 is shown, there may be multiple servers connected to the network 103 and accessible by the one or more workstations 102. The server 101 may host the virtual environment 105 and also contain a controller 104 and storage 106. Although not shown, the server 101 may also include components typically found in a server such as, for example, a network interface, an input device, etc. Therefore, a buyer at a workstation 102 may access the virtual environment 105 hosted on the server 101 and control an avatar in the virtual environment 105 to buy products or make other purchases or business transactions with a person, store, vendor, manufacturer, supplier, etc., which may also access the virtual environment and provide the products or services for sale in the virtual environment. The supplier of the product or services may also access the virtual world or environment 105 hosted on the server 101 via one or more workstations 102. Further, a virtual business object (VBO) may be generated by the supplier of the product or services, a vendor, a retailer, or a manufacturer upon completion of the transaction and sent to the buyer. The VBO may contain information related to the purchased product or service and the completed transaction. Although a server is shown as hosting the virtual environment 105, any type of network entity capable of hosting a virtual environment is within the scope of the present invention.

Moreover, a buyer at a workstation 102 may control an avatar to refer the purchased product or service by providing a partial version of the VBO (i.e., VBO light) to a second avatar. The VBO light may contain the same information as the VBO except information personal to the buyer such as, for example, warranty information, payment information, purchase receipt information, shipping information, etc. The VBO light may contain components and actions that may be initiated from the VBO light such as, for example, purchase product/service, discard VBO light, request additional information regarding product/service, etc. The second avatar may initiate the purchase of the product/service using the VBO light and conduct a transaction with the supplier of the product/service to complete the purchase. Upon completion of the transaction with the second avatar, the avatar may be sent compensation or incentives for referring the product/service to the second avatar.

Figure 2:
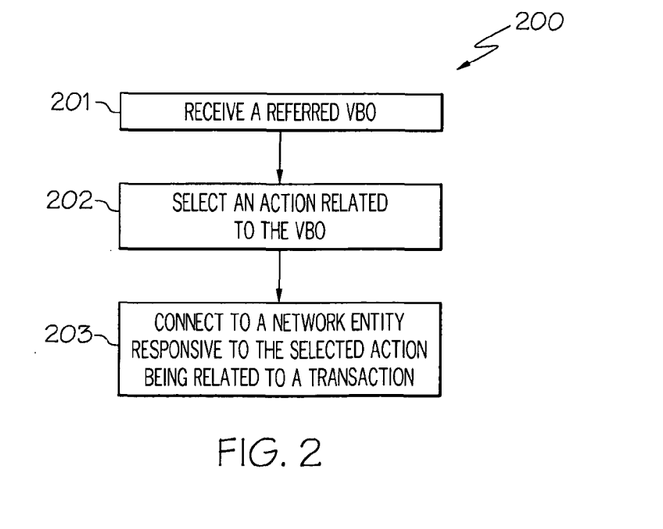
FIG. 2 is a flowchart of a process for transactions through a referred virtual business object (VBO) according to an exemplary embodiment of the present invention.

FIG. 2 shows a flowchart of a process for transactions through a referred virtual business object according to an exemplary embodiment of the present invention. In the process 200, in block 201, a referred VBO (i.e., VBO light) may be received. In block 202, an action related to the VBO light may be selected. In block 203, a connection to a network entity may be made responsive to the selected action being related to a transaction. For example, if an avatar selects to purchase a product referred to in the referred VBO light, the avatar may be connected to a source of the product in the virtual world allowing the initiation of a transaction for purchasing of the product.

Figure 3:
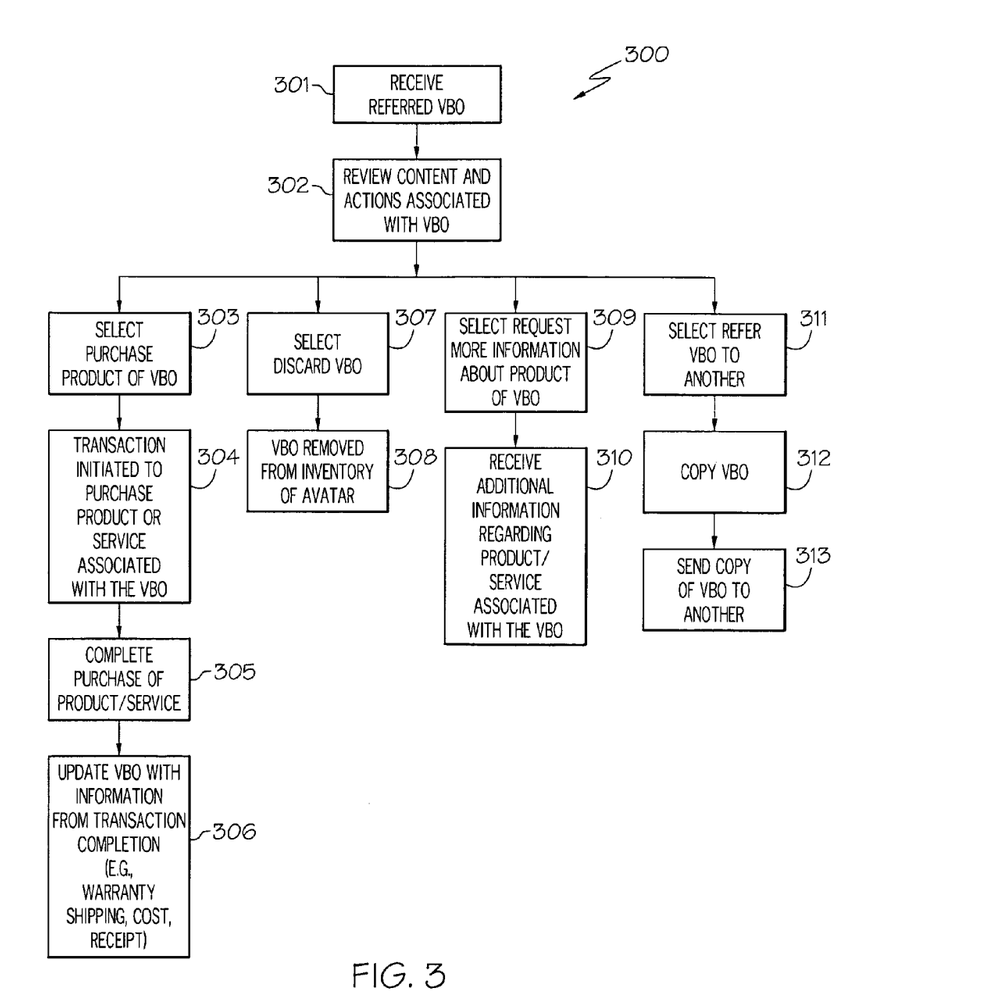
FIG. 3 is a flowchart of a process for options for transactions through a VBO according to an exemplary embodiment of the present invention.

FIG. 3 shows a flowchart of a process for options for transactions through a VBO according to an exemplary embodiment of the present invention. In the process 300, in block 301, a referred VBO may be received. In block 302, content and actions associated with the VBO may be reviewed. In block 303, a selection may be made to purchase a product or service of the referred VBO. Then in block 304, a transaction may be initiated to purchase the product or service associated with the referred VBO. In block 305, the purchase of the product or service may be completed. In block 306, the referred VBO may be updated with information from the completed transaction, for example, warranty information, shipping information, payment information, receipt information, etc.

Further, in block 307, a selection may be made to discard the referred VBO and then in block 308, the referred VBO may be removed from the inventory of the avatar. In addition, in block 309, a selection may be made to request more information about the product or service of the referred VBO and then in block 310, the avatar may receive additional information from a provider of the product or service regarding the product or service associated with the referred VBO. Moreover, in block 311, a selection may be made to refer the referred VBO to another avatar, or user. Alternatively, the user may refer a VBO generated based on completion of a purchase of a product or service associated with the referred VBO to another avatar or user. Then in block 312, a copy of the VBO may be made and in block 313, the copy of the VBO may then be sent to another user or avatar.

Figure 4:
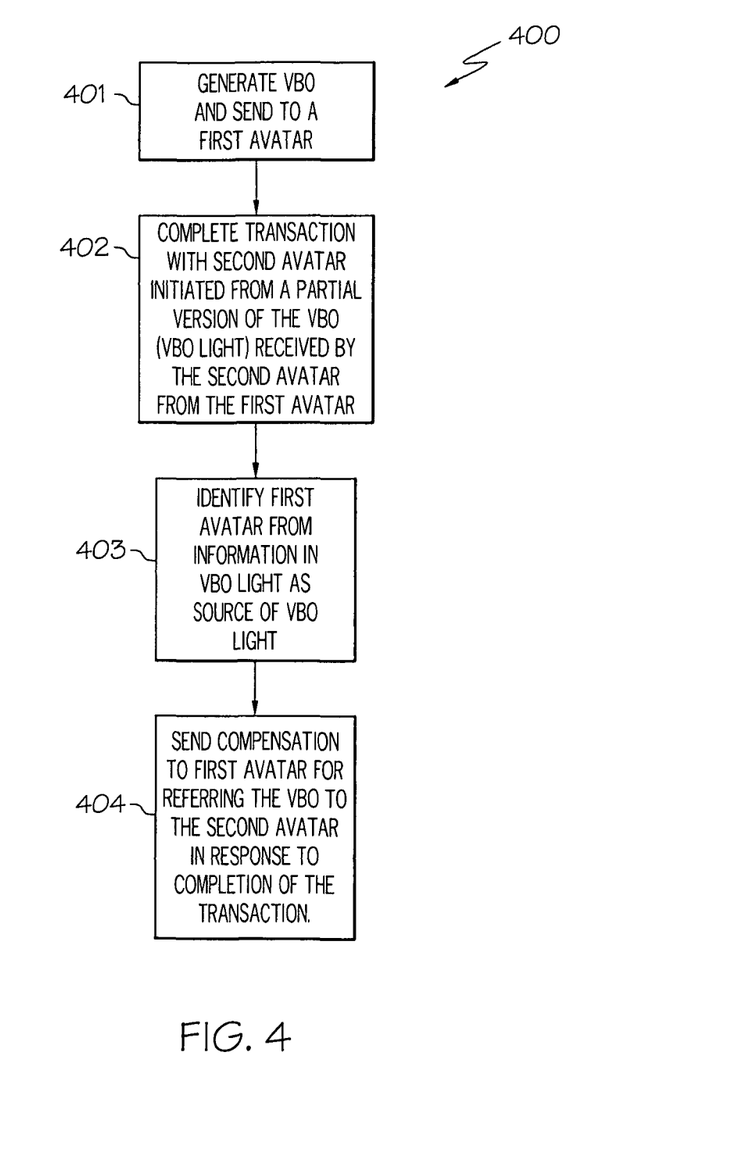
FIG. 4 is a flowchart of a process for providing compensation for transactions through a referred VBO according to an exemplary embodiment of the present invention.

FIG. 4 shows a flowchart of a process for providing compensation for transactions through a referred VBO according to an exemplary embodiment of the present invention. In the process 400, in block 401, a VBO may be generated and sent to a first avatar. In block 402, a transaction with a second avatar may be completed where the transaction was initiated from a partial copy the VBO (referred VBO, VBO light) received by the second avatar from the first avatar. In block 403, the first avatar may be identified from information in the VBO light as the source of the VBO light. In block 404, compensation may be sent to the first avatar for referring the VBO to the second avatar in response to completion of the transaction with the second avatar. Therefore, according to embodiments of the present invention, an avatar may be provided compensation for referring a VBO to a second avatar or user after the second avatar or user completes a transaction for purchasing the product or service associated with the VBO.

Figure 5:
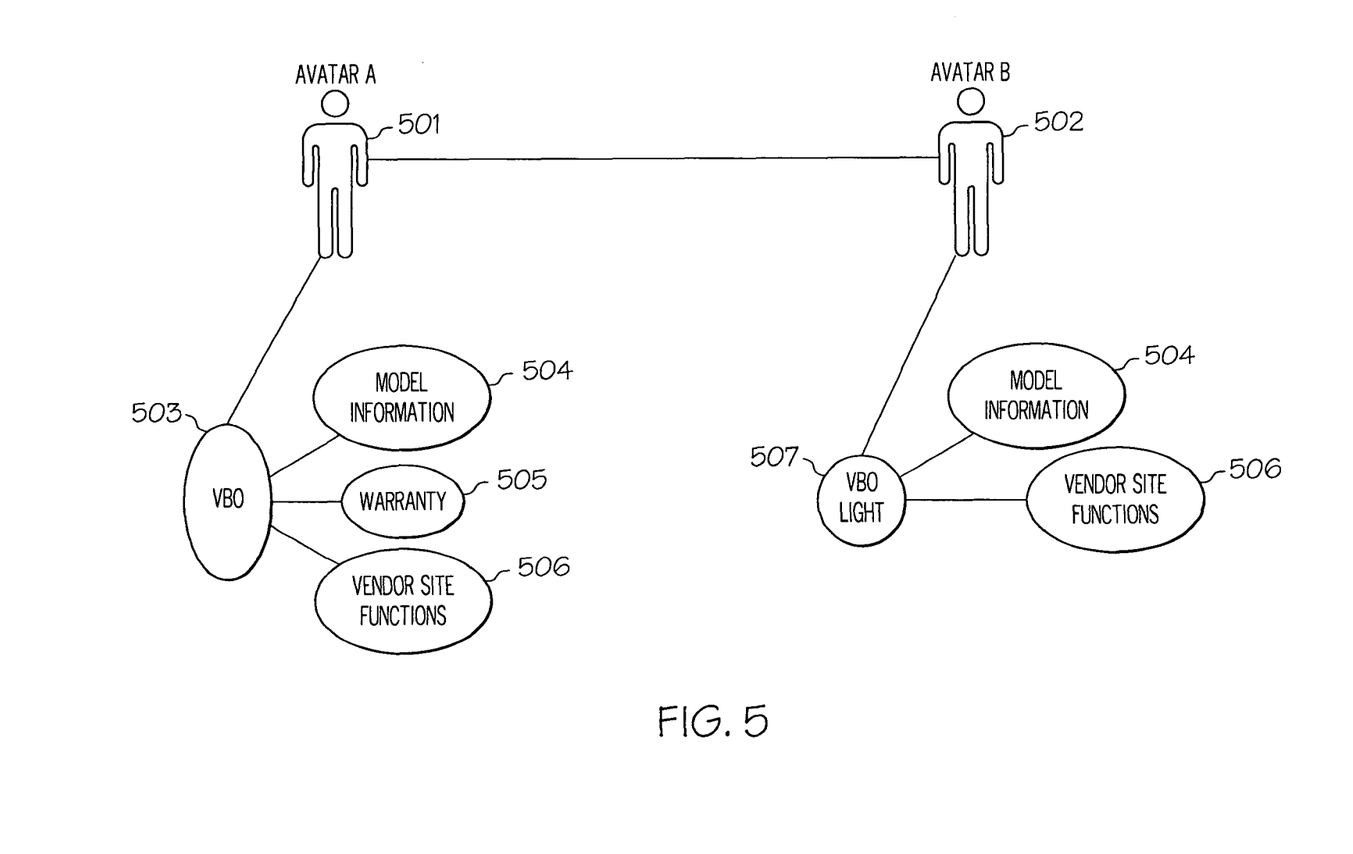
FIG. 5 is a diagram illustrating referring a VBO according to an exemplary embodiment of the present invention.

FIG. 5 shows a diagram illustrating referring a VBO according to an exemplary embodiment of the present invention. A first avatar 501 may refer a VBO (i.e., VBO light) to a second avatar 502. The first avatar 501 may have a VBO 503 with different components, for example; model information 504, warranty information 505, vendor functions 506, etc., associated with a product or service of the VBO. The first avatar 501 may refer the VBO 503 to the second avatar 502 by providing a copy of the VBO 503 (VBO light 507) to the second avatar 502 where the VBO light 507 may not include all of the information in the original VBO 503 such as, for example, personal information of the first avatar 501 (e.g., warranty information 505). Therefore, the second avatar 502 has the VBO light 507 containing components such as the model information 504 and vendor functions 506. The vendor functions 506 may include actions that may be taken on or initiated from the VBO light 507.

Figure 6:
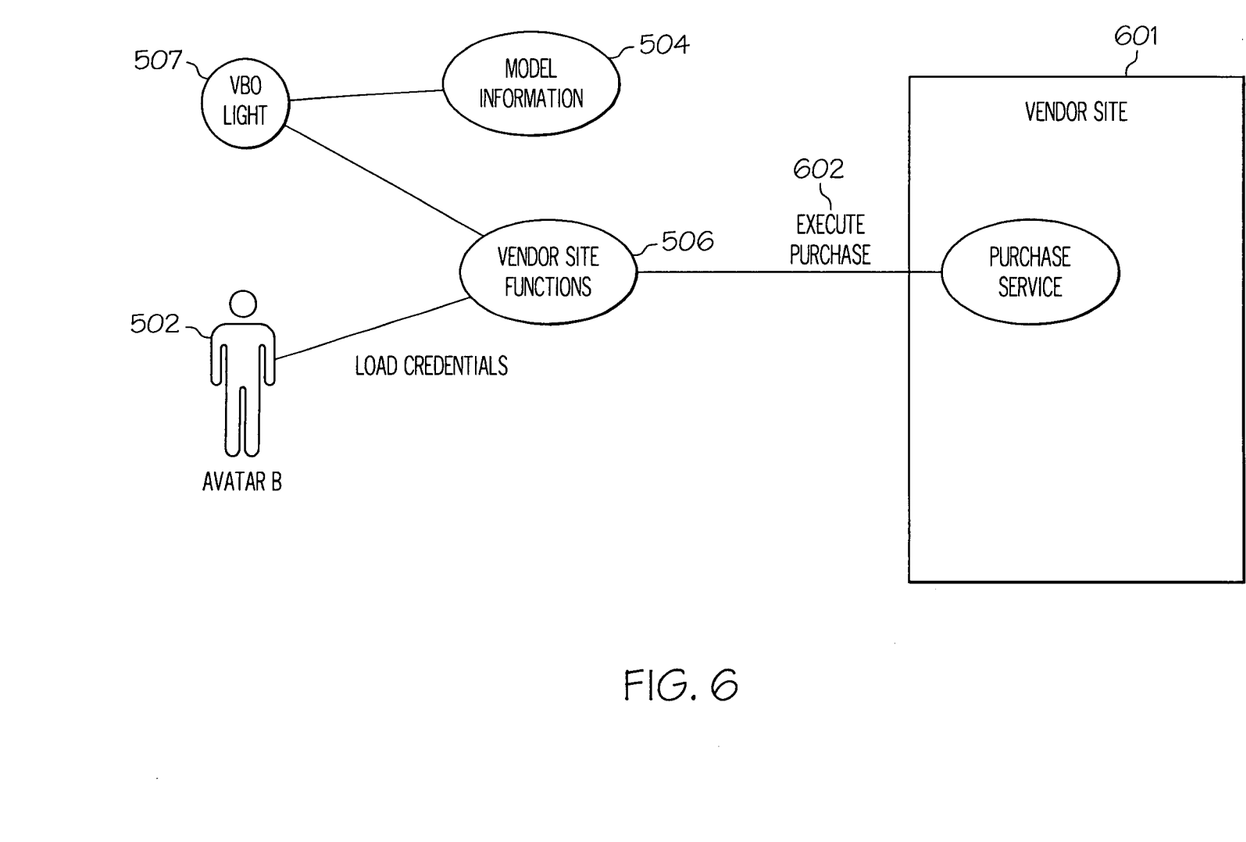
FIG. 6 is a diagram illustrating selection of a VBO action according to an exemplary embodiment of the present invention; and In FIG. 7 is a diagram illustrating updating a VBO according to an exemplary embodiment of the present invention.

FIG. 6 shows a diagram illustrating selection of a VBO action according to an exemplary embodiment of the present invention. A second avatar 502 may execute an action from one of the vendor functions 506 contained in a VBO light 507. The VBO light may be a referred VBO that is a copy of a VBO without personal information related to the owner of the VBO (whom made the referral). In this exemplary embodiment, the second avatar 502 may select to execute a purchase 602 of a product or service associated with the VBO light 507. This may cause connection with a vendor site 601 in a virtual world that provides the product or service related to the VBO light 507. Therefore, the avatar 502 may transact with the vendor site 601 to complete a transaction for purchase of a product or service associated with the VBO light.

Figure 7:
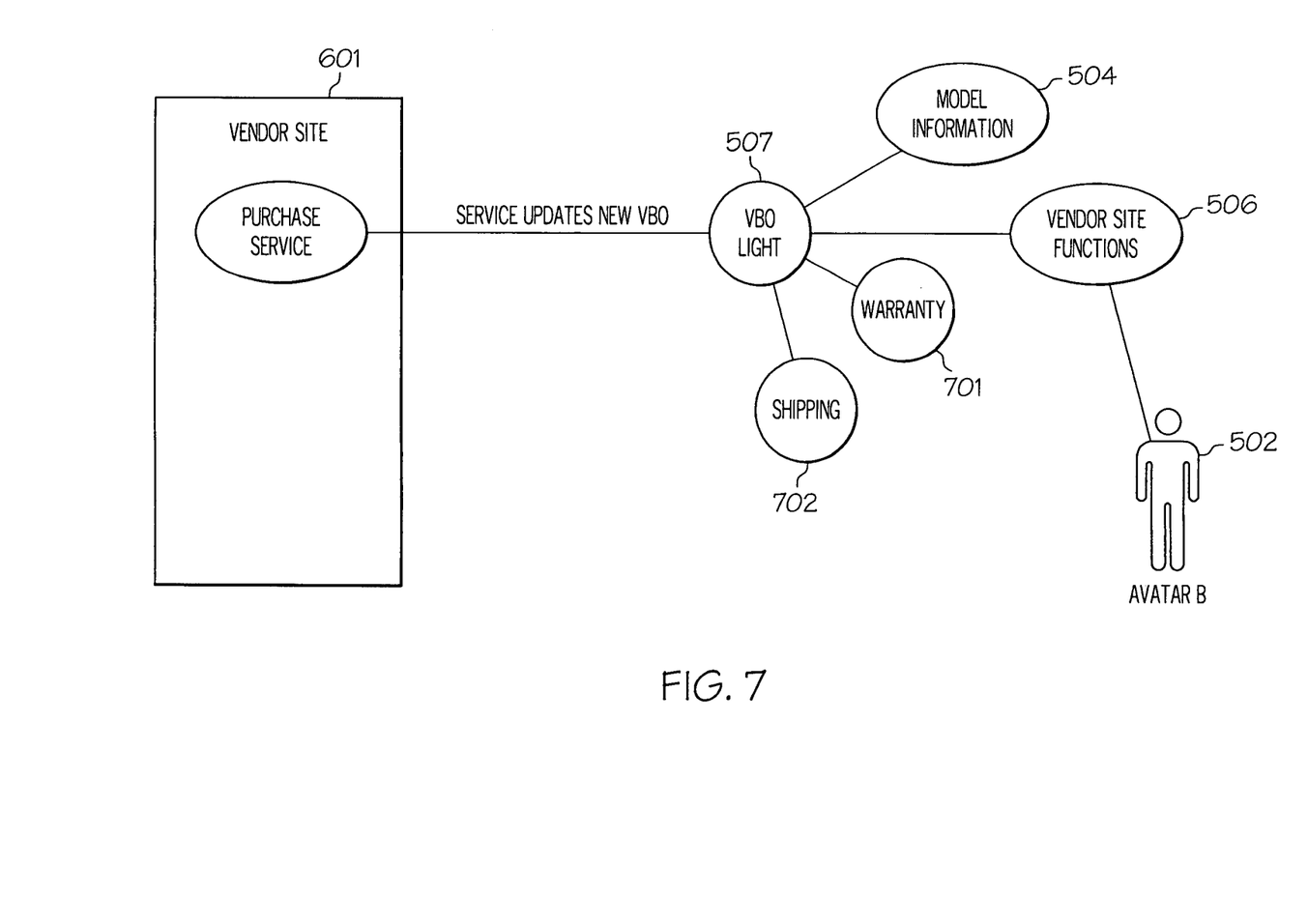

In FIG. 7 shows a diagram illustrating updating a VBO according to an exemplary embodiment of the present invention. An avatar 502 may complete a transaction for purchase of a product or service associated with the VBO light 507 with a vendor site 601. Upon completion of the transaction, the vendor site 601 may provide additional components to the VBO light associated with the completed transaction, thereby transforming the VBO light into a full VBO that not only contains product information but may also contain information related to the transaction and/or personal to the avatar 502. For example, the vendor site 601 may provide additional information such as warranty information 701, shipping information 702, receipt information, etc. This additional information becomes a part of the VBO light 507 (now a full VBO).

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for providing traceability in a Virtual Business Object (VBO) comprising:
   generating, by a computer, a first VBO in response to a transaction by a first avatar, the first VBO comprising components and actions that may be performed using the first VBO, wherein the transaction comprises a purchase of one of a product and a service by the first avatar, and the first VBO further comprising information about one of the product and the service purchased;
   providing, by the computer, the first VBO to the first avatar;
   creating a VBO light from the first VBO;
   attaching, by the computer, traceability information regarding the first avatar to the VBO light;
   providing the VBO light from the first avatar to a second avatar;
   add, by the computer, information to the VBO light to create a full second VBO in response to a purchase of one of the product and the service by the second avatar.

2. The method according to claim 1, further comprising performing a second transaction with the second avatar responsive to an action being received from the VBO light and providing compensation to the first avatar responsive to the complete second transaction.

3. The method according to claim 2, wherein providing compensation to the first avatar comprises providing at least one of money, a coupon, a product, a discount on a future purchases, points, referral status, and a first to the first avatar.

4. The method according to claim 2, further comprising providing additional compensation to the first avatar for each completed transaction with at least one third avatar initiated from at least one third VBO, each at least one third VBO being created from the first VBO.

5. The method according to claim 2, wherein the second transaction comprises the purchase of one of a product and a service associated with the VBO light, wherein the information added comprises at least one of warranty information, shipping information, and receipt information.

6. The method according to claim 2, wherein the action comprises a request for more information regarding one of a product and a service associated with the VBO light and sending additional information regarding the one of the product and the service associated with the VBO light.

7. The method according to claim 2, further comprising updating the VBO light with additional information related to the second transaction upon completion of the second transaction.

8. The method according to claim 7, wherein the additional information comprises at least one of warranty information, shipping information, payment information, and sales receipt information.

9. The method according to claim 2, further comprising receiving the traceability information regarding the first avatar from the VBO light enabling the providing of the compensation to the first avatar responsive to the completed second transaction, the traceability information comprising identity information of the first avatar.

10. The method according to claim 1, wherein the VBOs are generated by an enterprise service provider.

11. The method of claim 1, wherein the VBO light comprises a partial version of the first VBO.

12. The method of claim 11, wherein the VBO light comprises information related to the transaction by a first avatar except information personal to the first avatar.

13. A network entity configured to access a virtual world environment comprising:
   a computer;
   a network interface configured by the computer to provide access to the virtual world environment; and
   a controller configured by the computer to:
     perform a transaction with a first avatar in the virtual world environment;
     generate a first Virtual Business Object (VBO) Related to the transaction, wherein the transaction comprises a purchase of one of a product and a service by the first avatar, and the VBO comprises information about one of the product and the service purchased;
     provide the first VBO to the first avatar;
     create a VBO light from the first VBO;
     attach traceability information regarding the first avatar to the VBO light;
     provide the VBO light from the first avatar to a second avatar;
     adding information to the VBO light to create a full second VBO in response to a purchase of one of the product and the service by the second avatar.

14. The network entity according to claim 13, wherein the controller is further configured to perform a second transaction with the second avatar response to an action being received from the VBO light and providing compensation to the first avatar response to the completed second transaction.

15. The network entity according to claim 14, wherein the controller is further configured to provide additional compensation to the first avatar for each completed transaction with at least one third avatar initiated from at least one additional VBO, each at least one additional VBO being created from the first VBO.

16. The network entity according to claim 14, wherein the second transaction comprises a purchase of one of a product and service associated with the VBO light.

17. The network entity according to claim 14, wherein the action comprises a request for more information regarding one of a product and service associated with the VBO light and sending additional information regarding the one of a product and service associated with the VBO light.

18. The network entity according to claim 14, wherein the controller is further configured to update the VBO light with additional information related to the second transaction upon completion of the second transaction.

19. A computer program product comprising a non-transitory computer useable storage medium having computer useable program code embodied therewith, the computer useable program code comprising:
   computer useable program code configured to generate a first VBO in response to a transaction by a first avatar, the VBO comprising components and actions that may be performed using the first VBO, wherein the transaction comprises a purchase of one of a product and a service by the first avatar, and the first VBO further comprising information about one of the product and the service purchased;

computer useable program code configured to provide the first VBO to the first avatar;

computer useable program code configured to create a VBO light from the first VBO;

computer useable program code configured to attach traceability information regarding the first avatar to the VBO light;

computer useable program code configured to provide the VBO light from the first avatar to a second avatar;

computer useable program code configured to add information to the VBO light to create a full second VBO in response to a purchase of one of the product and the service by the second avatar.

20. The computer program product according to claim 19, further comprises computer useable program code configured to perform a second transaction with the second avatar response to an action being initiated from the VBO light and the computer useable program code configured to provide compensation to the first avatar responsive to the completed transaction.

21. The computer program product according to claim 20, further comprising computer useable program code configured to update the second VBO light with additional information related to the second transaction upon completion of the second transaction.

* * * * *